Patented May 7, 1935

2,000,028

UNITED STATES PATENT OFFICE 2,000,028

COMPOUNDING OF RUBBER, ETC.

Robert J. King and Elizabeth C. King, Stamford, Conn., assignors to The Robert J. King Company, Inc., Stamford, Conn., a corporation of Connecticut No Drawing. Application December 20, 1932, Serial No. 648,084

25 Claims. (Cl 106—23)

This invention relates to improvements in the processing and compounding of rubber and includes an improved compounding process and improved products resulting therefrom, as well as an improved composition for use in the compounding of rubber. More particularly, the invention relates to an improved composition for use in the compounding of rubber and an improved compounding process, whereby the compounding of rubber can be accomplished with important advantages in the saving of time and of power in rubber compounding, and with other advantages such as those hereinafter set forth.

Raw rubber as it comes to the mill is a tough, non-plastic material which must first be brought into a plastic condition and compounded with various compounding ingredients and then vulcanized to produce the vulcanized rubber products of commerce. The breaking down of the raw rubber to bring it into a plastic state so that the compounding materials may be incorporated with it is a difficult and expensive operation, involving the use of a large amount of power and heavy machinery, and requiring a considerable period of time. This breaking down and compounding operation is commonly carried out on so-called mixing rolls which are heated differential rolls on which the raw rubber is torn apart and gradually brought to a plastic state such that the compounding ingredients, mainly or largely in powdered form, can be incorporated. This mixing operation, aside from the time and power consumed, has an injurious effect on the rubber, particularly with the long period of mixing or mastication commonly required and used in the rubber mixing and compounding operation.

The present invention provides an improved method of compounding rubber in which the breaking down of the raw rubber is eliminated or minimized, in which pre-mastication of the rubber can be practically eliminated, in which the power consumption required for breaking down and compounding is greatly reduced, in which the time of mixing can be materially shortened, in which the mixing can be carried out at a lower temperature and dangerous scorching eliminated or minimized, in which the objectionable deterioration of the rubber due to prolonged mixing can be obviated or minimized, and which has other advantages such as those hereinafter pointed out.

The present invention is based upon the discovery that the processing and compounding of rubber can be greatly improved in the respects above mentioned by adding to the unbroken down or unplasticized rubber a liquid thermoplasticizing composition comprising a solution, in solvents which are also solvents for the rubber, of solvent activators, which compositions enable the unplasticized rubber to be rapidly converted into a plastic state ready for compounding. The effect of the use of such processing agents or compositions is apparently to disperse the rubber or so act upon it and upon its non-rubber constituents that it requires little or no breaking down of the rubber on the mill, thus enabling the compounding operation to be accomplished with an important saving in time and power required and with the avoidance of injury to the rubber such as is involved in the present day prolonged breaking down operations on the rubber compounding mill.

The solvents which have been found particularly advantageous in making the processing agent or composition are hydrocarbon solvents and particularly the hydrocarbon oil known commercially as mineral seal oil or 300° F. burning oil, having a fire test of about 300° F. Such hydrocarbon oil has the advantage over lighter and low boiling point hydrocarbons that it does not evaporate to any appreciable extent at the temperatures used in rubber compounding and vulcanizing, and it has the advantage over heavier hydrocarbon oils of being an active solvent for the rubber, particularly when it has a small amount of the solvent activator dissolved therein. Its use involves no special precautions to prevent evaporation and fire hazard during transportation, handling, storage and use.

Other solvents than petroleum hydrocarbons can also be used, such as certain coal tar oils obtained in the distillation and refining of coal tar which are solvents of rubber and also of the activating agents, and which have a suitable boiling point, e. g., certain neutral oils having a somewhat higher boiling point than solvent naphtha, as well as, in some cases, solvents of lower boiling point.

The term "solvents for rubber" as used herein is intended to describe those liquids or swelling agents and so-called solvents which are capable of forming colloidal solutions with rubber.

The so-called solvent activators which are used in solution in the solvents in making the processing agents or thermo-plasticizing compositions of the invention are substances which have a pronounced effect in promoting the solvent action of the hydrocarbon solvent on the rubber or the thermo-plasticizing effect on the rubber. Among the activators which have been found particularly advantageous are sulfonic acids or sulfonated products which are soluble in the solvent employed, and higher alcohols, particularly the non-hydrophilic alcohols containing four or more carbon atoms in the molecule.

The activators which have been found particularly valuable are oil soluble sulfonated hydrocarbons produced by the treatment of certain grades of lubricating stocks with 66° Bé. or fuming sulfuric acid and containing sulfonated materials or sulfonic acids as their main constituents, usually with smaller amounts of untreated oil or hydrocarbons and a very small amount of free sulfuric acid, such as the sulfonated products known in the trade as "Kontakt", and the sulfonated products marketed by the Twitchell Process Company under the trade name "Sulpho-A", which products find application for other purposes such as contact agents for the splitting of fats into free fatty acids and glycerin. Such sulfonated products are soluble in light hydrocarbon oils, as true solutions or colloidal solutions. As manufactured and marketed they may contain varying amounts of water, and, in that case, they are advantageously treated to eliminate or reduce their water content where this is sufficiently high to interfere with their solution or use.

Sulfonic acids or sulfonated products of aromatic or coal tar origin can also be employed, as well as sulfonated sperm oil and sulfonated castor oil, although they are less effective and in general less soluble in rubber solvents, and less advantageous in their action than the sulfonated petroleum products, such as those above mentioned.

Among the higher alcohols which have been found valuable, hexyl alcohol in particular may be mentioned, but other alcohols, such as normal butyl alcohol, and alcohols containing four or more carbon atoms in the molecule and which are soluble in the solvents used can similarly be employed. In general, these higher alcohols fall within the class of non-hydrophilic oil-soluble alcohols and they have a sufficiently high boiling point to be unobjectionable from that standpoint.

The addition of the higher alcohols alone to the rubber solvent increases in a very pronounced manner the absorption of the solvent and the resulting swelling of the rubber. The addition of the sulfonated hydrocarbons alone to the rubber solvent results in a pronounced increase in the fluxing of the rubber. When both the higher alcohols and the sulfonated hydrocarbons are added to the rubber solvent, the result is much more pronounced, and the composition has advantages when used as a thermoplasticizing composition in promoting the plasticizing of unmasticated rubber, which are far greater than those produced by the use of the alcohols or sulfonated oils alone with the rubber solvent.

The action of the new plasticizing composition in promoting the plasticizing of rubber appears to be due to the combined action of the rubber solvents and of the activating agents in which the solvents rapidly penetrate the rubber and the activating agents act probably upon the non-rubber constituents, with a result which appears to be the reverse of the coagulation of rubber and in the nature of a dispersion of the rubber. It is known that certain non-rubber constituents are included in rubber when it is coagulated from latex or when the latex is dried. Such non-rubber constituents are probably adsorbed on the minute rubber globules or particles and, in the dried rubber, are apparently distributed throughout the rubber mass in intimate association with the rubber particles or portions of the mass. While we do not wish to limit ourselves by any theoretical explanation of the action which takes place in the practice of the present invention, our investigations and observations lead us to consider the action of the new liquid thermo-plasticizing compositions to be a combined solvent and dispersing action, probably having to do with adsorbed non-rubber constituents located at the interfaces where the non-rubber constituents were adsorbed at the time of coagulation of the latex and subsequent drying, in the case of pale crepe rubber, etc., or at the time of drying of uncoagulated latex. If the thermo-plasticizing composition acted upon the adsorbed non-rubber constituents to facilitate or promote dispersion this, combined with such swelling as takes place due to the rubber solvent, might explain the pronounced effect which the compositions of the present invention have in facilitating the plasticizing of rubber.

The manufacture of the new processing agent or thermo-plasticizing composition is illustrated by the following example:—10 pounds of the sulfonated petroleum oil (Sulpho-A) were mixed in a wooden tank at room temperature with 5 gallons of mineral seal or 300° burning oil and allowed to stand for about two days. There was then mixed into the batch 2½ pounds of commercial secondary hexyl alcohol and the mixture was allowed to stand for about 14 hours. A small amount of thin liquid, consisting largely of water, settled to the bottom of the tank and was drawn off and discarded. The remaining mixture was then mixed with further amounts of mineral seal oil or 300° burning oil in the proportion of 4 gallons of the mixture to 53 gallons of the mineral seal oil, giving a processing agent or composition containing approximately 1.6% of the sulfonated petroleum oil product, about 0.4% of the hexyl alcohol and about 98.0% of the hydrocarbon oil.

Such a composition as that of this example apparently contains nearly the optimum of "solvent activators" as far as the maximum plasticizing effect on smoked sheets and pale crepe is concerned, and although more of the solvent activators apparently produces little further plasticizing effect, any lessening of the percent of solvent activators by neutralization or by lowering the amount used in the rubber mix produces a lowering of plasticization, and it is therefore sometimes advantageous to use somewhat increased amounts of the solvent activators as illustrated, for example, in the following formula for the plasticizing agent or composition.

96% Mineral seal or 300° burning oil
2% Sulfonated petroleum oil (Sulpho-A)
2% Commercial secondary hexyl or normal butyl alcohol Such processing agents or compositions are used in varying amounts in the compounding of rubber. In general, from around 4 to 8% of the agent or composition on the weight of the rubber will be sufficient for commercial rubber such as smoked sheets and pale crepe, although increased amounts can with advantage be used in some cases, particularly with reclaimed rubbers, or with rubber mixes which contain constituents that neutralize or interfere with the action of the solvent activators.

In using the new processing agent or composition the best results appear to be obtained by adding it to the unmasticated rubber prior to or at the beginning of the mixing operation. When the mixing and compounding is carried out on the open mill or mixing roll the liquid composition can be sprinkled on the rubber before placing it on the mill or applied as soon as or shortly after it is placed on the mill and before the addition of any of the pigments or compounding powders. Where the compounding is carried out in a mixer, such as the Banbury mixer, the liquid composition is advantageously added as soon as the rubber is placed in the mixer. Another method of adding the liquid composition is to add part at the beginning of the mixing operation and the remainder with the powders or after the powders are added. Another method of incorporation of the liquid is to add it to part of the rubber to form a master batch, for example, using 1 part of the liquid composition to 2 parts of rubber, by soaking the rubber in the liquid, and then using this master batch with the remainder of the rubber on the mill or in the mixer. Also, the proper amount of the liquid composition for a batch of rubber can be added to the rubber, or part of the rubber, beforehand and absorbed in it before milling.

In the present day practice of rubber compounding it is common, in the manufacture of various rubber compositions, to mill the rubber for as much as 30 minutes or more during the breaking down operation and before compounding; whereas the present process enables the entire breaking down and mixing operation to be completed in a few minutes' time.

For example, in the making of rubber gaskets it has been considered necessary at one factory to break down the rubber for a period of about 30 minutes, then warm it up in the Banbury mixer for about 6 minutes before adding the compounding powders, then to mix for a further period of about 7 minutes and finally to hold the resulting composition a further period of about 48 hours for seasoning before extrusion, whereas by the present process, and adding the processing composition to the rubber in a Banbury mixer after a preliminary hashing of 30 seconds, the breaking down was completed in about 4 minutes and the compounding powders incorporated with a further mixing of about 5 minutes, and the resulting stock was ready for extrusion without holding for seasoning, and showed improved results on vulcanization.

In another case where more than an hour had previously been consumed in breaking down the rubber and in mixing the compounding ingredients, the entire breaking down and compounding operation was completed in about 8 minutes in carrying out the present process, and improved results were obtained. In another case, in making a rubber composition for use as the upper stock for rubber boots it had been considered necessary to break down the rubber for about 2 hours, warm it in the Banbury mixer for about 4 minutes and then to add the compounding ingredients and mix for a further period of about 2½ minutes; whereas the entire result was accomplished by the present process in a period of about 7 minutes, the processing agent or composition (about 7% on the rubber) being added after a preliminary hashing of about 30 seconds in the Banbury mixer, followed by a further mixing of about 4 minutes, the addition of the compounding powders, and a final mixing of about 2 minutes.

The effect of the use of the processing agent or composition in the breaking down and compounding of rubber is practically to eliminate the breaking down operation and to eliminate the necessity of pre-mastication of the rubber. Crude rubber is commonly considered to be made up of two phases and the breaking down of the rubber on the mill prior to compounding is considered to break down and intermix the two phases to give a masticated product more of the nature of a single phase. The use of the processing agent or composition of the present invention apparently so acts on the raw rubber as to make possible the production of a product comparable with a single phase product with a minimum of mechanical breaking down of the rubber. The action of the processing agent or composition is perhaps that of a dispersing agent, breaking down the cohesion between the different parts of the rubber, or so acting upon the rubber as to promote its rapid breaking down into a practically uniform and homogeneous mixture without the deterioration involved in prior prolonged breaking down by mechanical treatment on the mill.

The present invention has many advantages in rubber factories where mixing rolls are used. The time required for breaking down and compounding can be greatly reduced, thus making possible the compounding of a greatly increased amount of rubber with the same compounding equipment, or making possible the use of less mill equipment for the same production capacity. The power consumption in mixing and processing is also greatly reduced as well as the time of mixing. Lower mixing temperatures can be used, danger of scorching eliminated or minimized, more uniform results can be obtained in the warming up, calendering and extruding operations, and improved physical qualities can be obtained in the resulting products or compounds.

The present invention is of particular value in enabling the breaking down and compounding operations to be carried out in mixing devices such as the Banbury mixer, where, in a few minutes' time, the raw rubber can be plasticized and compounded and prepared for finishing operations. Pre-mastication can be eliminated, the power consumption in mixing and processing greatly reduced, the time of mixing shortened, and the mixing accomplished at a lower average temperature. Sulfur and active accelerators can be compounded in the Banbury mixer, with elimination or minimizing of the danger of scorching. The necessity of aging or seasoning of the goods before vulcanizing can be eliminated or minimized. It is possible with the use of a Banbury mixer to accomplish results which have heretofore commonly required the use of mixing rolls for the preliminary breaking down of the rubber before compounding in the Banbury mixer.

The invention will be illustrated by the following specific examples, but it will be understood that the invention is not limited thereto. In these examples the processing agent or thermoplasticizing composition employed was made according to the specific example given above, and contained approximately 1.6% of sulfonated petroleum oil (Sulpho-A), about 0.4% of commercial secondary hexyl alcohol, and about 98.0% of mineral seal or 300° burning oil. In the following examples, the parts are by weight.

*Example A.*—The following formula is suitable for use for making rubber gaskets.

| | |
|---|---|
| Rubber | 100 |
| Thermo-plasticizing composition | 6 |
| Zinc oxide | 10 |
| Whiting | 150 |
| Red oxide of iron | 2 |
| Petrolatum-white | 5 |
| Phenyl-beta-naphthylamine (Age Rite powder) | 1 |
| Sulfur | 3 |
| Benzo-thiazyl-disulfide (Altax) | 1 |

In carrying out the process with this formula, the crude rubber, taken directly from the bale, can be hashed for about 30 seconds in a Banbury mixer, the thermo-plasticizing composition then added, and the mixing continued for about 4 minutes, when the rubber is ready for adding the compounding powders. The mixture of whiting and zinc oxide can then be added and the mixing continued for a further period of about 5 minutes, after which the petrolatum is added and the sulfur, accelerator and antioxidant uniformly admixed. The resulting stock is available immediately for extrusion from a tubing machine and for vulcanization, for example, by an open steam cure for a suitable time, e. g. about 15 minutes at a temperature of around 141° C.

The present process overcomes the objections to prior processes of making gaskets where a prolonged breaking down has been employed, for example, around 30 minutes prior to compounding, and where a period e. g. of 48 hours has been used to season the compounded mixture before extrusion.

*Example B.*—The following compound is suitable for use for making a crepe rubber sole stock.

| | |
|---|---|
| Pale crepe | 100 |
| Thermo-plasticizing composition | 8 |
| Cotton linters | 5 |
| Zinc oxide | 2 |
| Whiting | 5 |
| Sulfur | 3 |
| Tetra-methyl-thiuramdisulphide (Tuads) | 0.1 |
| Mercapto-benzo-thiazole (Captax) | 1 |

In using this formula the rubber can be taken direct from the bale and hashed for about 30 seconds in a Banbury mixer, the processing agent then added and the mixing continued for about 6 minutes. The thermo-plasticizing composition is rapidly taken up by the rubber, and the rubber is rapidly converted into a plastic state. The whiting and zinc oxide and sulfur can then be added and the mixing continued e. g. for about 2½ minutes, after which the accelerator and linters can be added, or these can be added with the sulfur. The resulting stock works satisfactorily in the cracking mill and warming-up mill and calenders satisfactorily, giving improved uniformity. Such a stock can be vulcanized e. g. by dry heat with a 60 minute rise to 125° C. and a cure of about 45 minutes at that temperature.

In the handling of a similar stock according to the old practice, the rubber has been subjected to a breaking down treatment of about 1 hour prior to compounding.

*Example C.*—The following formula is suitable for an upper stock for rubber boots.

| | |
|---|---|
| Smoked sheets | 100 |
| Thermo-plasticizing composition | 7 |
| Zinc oxide | 5 |
| Montan wax | 2 |
| Mercapto-benzo-thiazole (Captax) | 0.8 |
| Sulfur | 2.5 |
| Paraffin oil | 2 |
| Phenyl - beta - naphthylamine (Age Rite powder) | 1 |
| Gas black | 10 |
| Whiting | 35 |

In compounding the ingredients, the rubber can be taken direct from the bale, added to the Banbury mixer together with about 4% of whiting to help break up the rubber and expose a large surface, and the rubber hashed in the Banbury mixer for about 30 seconds, after which the thermo-plasticizing composition can be added and the rubber mixed for a further period of about 4 minutes, when it is ready for the addition of the other compounding powders, which can be incorporated with the further mixing of about 2 minutes. The resulting mixture can be cured, e. g. with dry heat, with a 60 minute rise in temperature to 130° C., and about 45 minutes at that temperature.

In the compounding of a similar stock in which the thermo-plasticizing composition was not employed, it had previously been deemed necessary to break down the rubber for about 2 hours, then to warm it in the Banbury mixer for about 4 minutes before adding the compounding powders, and then to continue the mixing for a further period of about 2½ minutes.

*Example D.*—The following formula is suitable for a wire insulation stock.

| | |
|---|---|
| Rubber | 100 |
| Thermo-plasticizing composition | 5 |
| Whiting | 100 |
| Zinc oxide | 100 |
| Paraffin | 3 |
| Phenyl - beta - naphthylamine (Age Rite powder) | 1 |
| Sulfur | 2.5 |
| Mercapto-benzo-thiazole (Captax) | 0.75 |

In compounding these ingredients the rubber, in the form of smoked sheets, can be taken directly from the bale and hashed for about 40 seconds in the Banbury mixer, the thermo-plasticizing composition then added and mixed for about 1 minute, the other compounding ingredients then added and the mixing continued for a further period of about 9 minutes. The resulting stock is suitable for straining and extrusion without seasoning, and the cure can be accomplished, for example, in talc, with open steam heating, with a 60 minutes' rise to about 125° C. and about 45 minutes at that temperature.

In the manufacture of similar wire insulation it had been deemed necessary to break down the rubber for about 30 minutes before compounding, and to season the stock before extrusion.

*Example E.*—The following example illustrates the production of an upper stock for shoes, using a mixing roll instead of a Banbury mixer.

| | |
|---|---|
| Rubber | 100 |
| Thermo-plasticizing composition | 5 |
| Zinc oxide | 10 |
| Gas black | 5 |
| Whiting | 75 |
| Mercapto-benzo-thiazole (Captax) | 1 |
| Sulfur | 2.5 |
| Paraffin oil | 2 |
| Phenyl-beta-naphthylamine (Age Rite powder) | 1 |

In compounding the stock, the raw unmilled rubber can be put on an apron mill and in 4 or 5 minutes a rough "bank" of rubber can be formed on the top of the rolls. The thermo-plasticizing composition can then be added and the milling continued for about 3 or 4 minutes, after which the rubber is ready for the addition of the compounding powders which may have a part of the processing agent incorporated with them, e. g. half of the thermo-plasticizing composition. The milling is continued for a further period of about 12 minutes, making a total period of around 20 minutes or less before unloading the mill. The resulting mixture can be vulcanized e. g. with dry heat and with a 60 minute rise in temperature to about 130° C., and about 45 minutes at that temperature.

In the compounding of similar stock by the old practice, the breaking down operation has occupied e. g. around 30 minutes, and the mixing e. g. around another 30 minutes. The present process, moreover, enables a larger batch to be mixed on the mill, as well as a greatly reduced time of mixing.

In the processes of the preceding examples, instead of first adding the rubber to the mixer or to the rolls, before adding the thermo-plasticizing composition, the composition can with advantage be added to the rubber beforehand and absorbed by the rubber. By permitting the rubber to stand a few hours, the composition will be completely absorbed so that the oiliness of the rubber surface will disappear almost completely and the surface will be tacky. If traces of oiliness remain, the rolls can be dusted with a little whiting to assist them in seizing the rubber properly, where it is compounded on the rolls.

*Example F.*—The following two formulæ show somewhat different stocks suitable for making solid rubber baby-carriage tires.

| | | |
|---|---|---|
| Rubber | 84 | 40 |
| Reclaim | 32 | 100 |
| Carbon black | 20 | |
| Mineral rubber | | 60 |
| Thermo-plasticizing composition | 5 | 5 |
| Clay | 270 | 180 |
| Zinc oxide | 10 | 10 |
| Sulfur | 4 | 4 |
| Benzyl-thiazyl-disulfide (Altax) | 1.25 | 1.25 |
| Phenyl-beta-naphthylamine (Age Rite powder) | 1 | 1 |
| Stearic acid | 3 | 3 |

These stocks, after compounding, for example, in the manner described in the preceding examples, can be cured with open steam, e. g. for about 20 minutes at around 148° C.

Not only can the time of compounding be greatly reduced, as compared with prior processes, but the compounded stock can be extruded without the necessity of seasoning it e. g. for two days or so after mixing and before extrusion before it can be extruded properly. The stock of the above example can be extruded the same day it is mixed.

*Example G.*—The following formula shows a tread stock compound to which no thermo-plasticizing agent is added and which, in the comparative tests referred to below will be identified as batch No. 1 or the control batch.

Smoked sheets _____ 100
Gas black _____ 50
Zinc oxide _____ 5
Sulfur _____ 3
Stearic acid _____ 4
Phenyl-beta-naphthylamine (Age Rite powder) _____ 1.5
Mercapto-benzo-thiazole (Captax) _____ 1.25

A series of batches were made using first this tread stock formula without any additions (batch 1), with the same tread stock formula to which pine tar was added as the softener (batches 2 and 3) and with the same tread stock formula to which the thermo-plasticizing composition was added (batches 4 and 5). The composition of the formulæ of the respective batches are given below.

| Batch Nos. | 1 | 2 and 3 | 4 | 5 |
|---|---|---|---|---|
| Smoked sheets | 100 | 100 | 100 | 100 |
| Gas black | 50 | 50 | 50 | 50 |
| Zinc oxide | 5 | 5 | 5 | 5 |
| Sulfur | 3 | 3 | 3 | 3 |
| Stearic acid | 4 | 4 | 4 | 4 |
| Phenyl-beta-naphthylamine (Age Rite powder) | 1.5 | 1.5 | 1.5 | 1.5 |
| Mercapto-benzo-thiazole (Captax) | 1.25 | 1.25 | 1.25 | 1.25 |
| Pine tar | 0 | 8 | 0 | 0 |
| Thermo-plasticizing composition | 0 | 0 | 8 | 4 |

Batch No. 1 was the control batch. Batch No. 2, which contained pine tar as a softener, was premasticated or broken down for 10 minutes in a Banbury mixer and worked for 8 minutes on a sheeting out mill, a procedure followed in many tire factories in mixing tread stock. With batch No. 3 the pre-masticating or breaking down operation of batch No. 2 was omitted. Batch No. 4, without pine tar but with the addition of a similar amount of the thermo-plasticizing composition was carried out for comparative purposes and without attempting to obtain the full advantages of the use of the thermo-plasticizing composition. Batch No. 5 was carried out with a smaller amount of the plasticizing composition and with a reduced time of mixing. With batches 4 and 5 the composition was added to the Banbury mixer at the beginning of the operation.

All of the batches except the last one were mixed for 12 minutes, which is the approximate period of time ordinarily taken to mix a tread stock in tire factories, and which is a longer period of time than required in carrying out the present invention, e. g. as shown by batch 5.

Measurements were made of the power required for the mixing operation, and the maximum temperature reached during the mixing operation. The products were tested with a Williams plastometer to show the softness and plasticity of the product as indicated by the "flow number" and the "recovery." The flow number indicates the softness of the rubber as shown by the thickness to which a pellet is compressed under a given pressure. The smaller the flow number the softer the compound. The recovery indicates the plasticity of the rubber as shown by the amount that the pellet springs back. The smaller the recovery, the more plastic the compound.

Laboratory physical tests were also made of the vulcanized products. The results of the tests made on the different batches are shown in the following tables:

| Batch No. | 1 | 2 | 3 | 4 | 5 |
|---|---|---|---|---|---|
| Total time in Banbury in minutes | 12 | 12 | 12 | 12 | 8 |
| Maximum temperature degrees F | 226 | 213 | 222 | 212 | 193 |
| Total power K. W. hours | 7.4 | 11.97 | 7.61 | 6.63 | 4.42 |
| Power percentage above or below control | 0 | +61.8 | +2.8 | −10.4 | −40.4 |
| Flow number Williams plastometer | 661 | 384 | 562 | 538 | 572 |
| Recovery Williams plastometer | 336 | 13 | 234 | 130 | 108 |
| S/S at 300% | 1730 | 1315 | 1285 | 1275 | 1520 |
| Tensile at break | 4530 | 4160 | 4290 | 4260 | 4640 |
| Percent elongation | 570 | 615 | 630 | 630 | 615 |
| Kelly abrasion volume loss | 277 | 398 | 399 | 323 | 273 |

The temperature given in this tabulation is the temperature reached by the mechanical working of the rubber.

The power consumed in part of the pre-mastication of the second batch was not included. The reduction in power consumption represents a substantial reduction in cost of the mixing operation. The reduction in temperature during mixing reduces the danger of scorching.

The physical tests indicated by the above tabulation in the column headed "S/S at 300%" indicate the force per square inch of cross-section necessary to stretch a sample to four times its original length.

The "volume loss" shown by the Kelly abrasion test gives the amount of material worn off a test sheet in a given length of time in a Kelly abrasion machine.

Batch 1, which was the control batch, and which contained no softener and no thermo-plasticizing composition, showed high tensile strength and low abrasive loss, but it showed such a high flow number and high recovery that it would not be plastic enough to work through the finishing machines of a rubber factory. The maximum mixing temperature was also high. While many of the characteristics of this batch are desirable in the rubber compound, the unworkability of the compound makes it of little interest.

The pre-mastication or breaking down treatment of batch 2, and the addition of 8% of pine tar in the mixing operation are for the purpose of rendering the batch plastic, in acordance with common procedure with tread stock formulas. The result is that the mixing temperature is somewhat reduced, but the amount of power used, as shown by the above table, which includes part of the pre-mastication in the Banbury but does not include that part done on the roll mill, was high. The batch was extremely plastic but the tensile strength had dropped to a low figure and the abrasive loss was large, these last two properties being serious defects in a tire compound.

With bath 3 the preliminary plasticizing operation, prior to mixing, was omitted. The results show that the mixing temperature and the power consumption were similar to batch 1. The high recovery figure shows that the pine tar was not very effective as a plasticizing agent, and the bad effect of the pine tar on abrasion is shown strikingly by the abrasion loss, the same as it is with batch 2.

With bath 4 the 8% of the plasticizing composition was added at once and the mixing time was kept at 12 minutes to obtain figures comparable with the control batch and with batches 2 and 3. The maximum mixing temperature of 212° is considerably lower than the control batch and batch 3 and well below the scorching point. The power consumption was materially reduced and was approximately half that used with batch 2 where the rubber was pre-masticated according to the usual practice. The improved softening and plasticizing effect of the plasticizing composition is indicated by the flow number of 538 and the recovery of 130, these being markedly lower than the corresponding figures for batches 1 and 3. The still lower figures of batch 2 are the result of the expensive pre-masticating operation by which the rubber was plasticized with resulting added expense and objectionable prolonged mechanical working of the rubber. The abrasion loss with the product of batch 4 was materially less than with the batches made with pine tar.

With batch 5 a smaller amount of the plasticizing composition was used, and a substantially reduced time of mixing, in order to develop the advantages of the invention to a greater extent than is possible with the comparative test indicated by batch 4 where the mixing time was longer than was needed.

The results shown by batch 5 illustrate certain of the outstanding advantages of the invention. The shortening of the time by ⅓ makes possible the mixing of an increased number of batches with the same machinery, that is, it enables approximately a 50% increase in production with the same overhead expense such as depreciation of machinery, repairs, investment, etc. It makes possible a greatly increased productive capacity of a mill room which has reached the limit of productive capacity by prior methods of operation, making it possible to eliminate the necessity of an increased investment for increased plant capacity and new equipment.

The power consumption with batch 5 is even more pronounced than the reduction of time consumed for the mixing operation.

The plastometer readings for batch 5 show good workable qualities in the compound. This batch shows high tensile strength and low loss by abrasion. The softness and plasticity can be controlled by varying the amount of the plasticizing composition added, and greater softness and plasticity can be obtained with a larger percentage of the composition.

In the above examples, the alcohol used in the thermo-plasticizing composition was the commercial secondary hexyl alcohol. Other higher alcohols can be used, particularly those containing more than 3 carbon atoms and which are relatively non-volatile and non-hydrophilic. These higher alcohols include the butyl, amyl and hexyl alcohols, as well as the higher alcohols containing more than 6 carbon atoms, and also including such alcohols as cyclo-hexyl alcohol, benzyl alcohol, cinnamyl alcohol, etc.

The sulfonic acid or sulfonted compound employed in the thermo-plasticizing composition of the above examples was the sulfonated petroleum oil product marketed under the name "Sulpho-A", but other suitable sulfonated products can be used, such as other sulfonated petroleum products, sulfonated sperm oil (e. g. Napco No. 1216), sulfonated castor oil (e. g. albasol), and also certain sulfonic acids of aromatic hydrocarbons which are soluble in the rubber solvents employed in making the composition.

Among the advantages obtainable by the practice of the present invention may be mentioned the following:

1. Simplification of the rubber mill room procedure due to the introduction of the raw rubber at the mixing machine and the elimination of the prior breaking down operation as well as the elimination of the usual hold-over of stock after breaking down and before mixing.

2. Elimination or minimizing of danger of premature vulcanization or scorching during compounding and prior to vulcanization. The effect of the processing agent or thermo-plasticizing composition is similar to that of an internal-lubricant, apparently acting either upon the non-rubber substances of the rubber, or upon the rubber itself, or upon both the rubber and non-rubber constituents, apparently as a dispersing agent, or to destroy or reduce the surface tension of adsorbed non-rubber particles, so that the amount of power required is greatly reduced, the time required to render the rubber plastic is greatly reduced, and less heat is developed in the mass of the rubber.

3. More freedom is permitted in the use of powerful accelerators which ordinarily have a tendency to cause scorching.

4. A more complete standardization of rubber mill room operations is made possible and a greater uniformity of the compounded product. The variable plasticizing effect of mechanical working, according to prior practice, is largely overcome and uniform and predictable plasticizing results can be obtained. Difficulties resulting, for example, from over-gauge or over-thick material, and resultant waste, can be obviated in calendering, and a more uniform calendering operation can be obtained, with less change of the setting of the calender. There is also less waste due to "clubbing up" or thickening at the ends of calendered sheets, due to contraction of the material.

5. An improved dispersion of the compounding ingredients or powders through the rubber compounds is made possible.

6. In the case of extruded compounds, increased speed of extrusion is possible.

7. In the case of wire insulation, improved concentricity is obtainable with less tendency to flatten.

8. A greatly increased output of the breaking down and mixing mills is made possible.

Other advantages which have been obtained by the practice of the invention include improved ageing properties, increased resistance to abrasion, and improved thermoplastic properties as shown by plastometer determinations. When subjected to plastometer tests, the determinations show that the new rubber compounds before vulcanization are softer, as indicated by the flow number, and have much less resilience, as shown by the recovery. The modulus (stress divided by strain) of the vulcanized product can often be considerably reduced to advantage without a corresponding reduction in tensile or other desirable physical properties.

It will thus be seen that the present invention presents many advantages in rubber compounding, providing an improved processing agent or composition of a liquid character comprising a rubber solvent and a solvent activator which enables improved thermo-plasticizing results to be obtained, with elimination or minimizing of the breaking down of rubber, with important economies and saving of time of compounding and of power required, and with other advantages, such as those above indicated.

We claim:

1. An improved thermo-plasticizing composition for use in the compounding of rubber, said composition being a liquid composition made up for the most part of a hydrocarbon solvent of rubber which is substantially non-volatile at the usual temperatures of rubber compounding and vulcanizing, said solvent having dissolved therein an oil-soluble sulfonated product as an activator, said composition acting on unmasticated rubber to enable the rubber to be readily plasticized and made ready for compounding substantially without preliminary mastication and with an important saving in time and power required.

2. An improved thermo-plasticizing composition for use in the compounding of rubber, said composition being a liquid composition made up for the most part of a hydrocarbon solvent of rubber which is substantially non-volatile at the temperatures of rubber compounding and vulcanizing, said solvent having dissolved therein an oil-soluble sulfonated product as an activator and also containing an alcohol with more than three carbon atoms, said composition acting on unmasticated rubber to enable the rubber to be readily plasticized and made ready for compounding substantially without preliminary mastication and with an important saving in time and power required.

3. An improved thermo-plasticizing composition for use in the compounding of rubber, said composition being a liquid composition made up for the most part of a hydrocarbon solvent of rubber which is substantially non-volatile at the temperatures of rubber compounding and vulcanizing, said hydrocarbon having dissolved therein an oil-soluble higher alcohol as an activator, said composition acting on unmasticated rubber to enable the rubber to be readily plasticized and made ready for compounding substantially without preliminary mastication and with an important saving in time and power required.

4. An improved thermo-plasticizing composition for use in the compounding of rubber, said composition being a liquid composition made up for the most part of 300° burning oil, having dissolved therein an oil-soluble sulfonated petroleum oil as an activator, said composition acting on unmasticated rubber to enable the rubber to be readily plasticized and made ready for compounding substantially without preliminary mastication and with an important saving in time and power required.

5. An improved thermo-plasticizing composition for use in the compounding of rubber, said composition being a liquid composition made up for the most part of 300° burning oil, having dissolved therein an oil-soluble sulfonated petroleum oil as an activator and also containing a higher alcohol, said composition acting on unmasticated rubber to enable the rubber to be readily plasticized and made ready for compounding substantially without preliminary mastication and with an important saving in time and power required.

6. An improved thermo-plasticizing composition for use in the compounding of rubber, said composition being a liquid composition made up for the most part of 300° burning oil, having dissolved therein secondary hexyl alcohol as an activator, said composition acting on unmasticated rubber to enable the rubber to be readily plasticized and made ready for compounding substantially without preliminary mastication and with an important saving in time and power required.

7. The improvement in the compounding of rubber which comprises adding to unplasticized rubber a small amount of a liquid thermo-plasticizing composition made up for the most part of a liquid solvent for rubber and which contains dissolved therein a small amount of an oil-soluble sulfonated product as an activator, said composition enabling the rubber to be readily plasticized and made ready for compounding substantially without preliminary mastication and with an important saving in time and power required, and working the rubber to convert it into a plastic condition.

8. The improvement in the compounding of rubber which comprises adding to the rubber, before compounding, and without prolonged breaking down or mastication, a small amount of a liquid thermo-plasticizing composition made up for the most part of a liquid hydrocarbon which is a solvent for rubber and which contains therein a small amount of an oil-soluble sulfonated petroleum product as an activator, said composition enabling the rubber to be converted into a plastic mass ready for compounding with a material saving in time and power required, working the rubber to convert it into a plastic mass suitable for compounding, and incorporating the compounding ingredients therewith.

9. The improvement in the compounding of rubber which comprises adding to raw rubber in a substantially unworked condition a small amount of a liquid thermo-plasticizing composition made up for the most part of a liquid hydrocarbon solvent of rubber which is substantially non-volatile at the temperatures of rubber compounding and vulcanizing, which hydrocarbon contains dissolved therein a small amount of an oil-soluble sulfonated petroleum product as an activator, working the rubber to convert the rubber into a plastic mass suitable for compounding, and incorporating the compounding ingredients with the resulting plastic mass.

10. The improvement in the compounding of rubber which comprises subjecting raw rubber to a plasticizing treatment on mixing rolls with the addition to the rubber of a small amount of a liquid thermo-plasticizing composition made up for the most part of a substantially non-volatile solvent of rubber containing dissolved therein an oil-soluble sulfonated product as an activator, whereby the rubber can be rapidly converted into a plastic state ready for compounding, and incorporating the compounding ingredients with the resulting plastic mass.

11. The improvements in the compounding of rubber which comprises adding to the rubber a small amount of a liquid thermo-plasticizing composition made up for the most part of a substantially non-volatile liquid hydrocarbon solvent of rubber containing dissolved therein a small amount of an oil-soluble sulfonated petroleum oil as an activator, subjecting the rubber to which such composition is added to a mixing treatment in a Banbury mixer to effect rapid plasticizing of the rubber and to produce a plastic mass ready for compounding and incorporating the compounding ingredients with the resulting plastic mass.

12. The improvement in the compounding of rubber which comprises subjecting the raw rubber to mechanical working with the addition thereto of a small amount of a liquid thermo-plasticizing composition made up for the most part of a substantially non-volatile liquid solvent of rubber, non-volatile at the usual temperatures of compounding and vulcanizing, having dissolved therein a small amount of a solvent activator, whereby the raw rubber can be rapidly converted into a plastic mass ready for compounding.

13. The improvement in the preparation of raw rubber for compounding which comprises subjecting the raw rubber to the action of a mixer of the Banbury type with the addition to the raw rubber of a small amount of a liquid thermo-plasticizing composition made up for the most part of a liquid solvent of rubber containing dissolved therein a small amount of an oil-soluble sulfonated petroleum product as an activator, whereby the rubber can be rapidly converted into a plastic state in such mixer.

14. The improvement in the compounding of rubber which comprises subjecting unplasticized rubber to mechanical working with the addition thereto of a small amount of a liquid thermo-plasticizing composition made up for the most part of a liquid solvent of rubber having dissolved therein a small amount of a higher alcohol, whereby the raw rubber can be rapidly converted into a plastic mass ready for compounding.

15. The improvement in the compounding of rubber which comprises subjecting unplasticized rubber to mechanical working with the addition thereto of a small amount of a liquid thermo-plasticizing composition made up for the most part of a liquid solvent of rubber having dissolved therein a small amount of a higher alcohol and also containing a small amount of an oil-soluble sulfonated petroleum product, whereby the raw rubber can be rapidly converted into a plastic mass ready for compounding.

16. The improvement in the compounding of rubber which comprises forming a master batch of part of the rubber with a large amount of a liquid thermo-plasticizing composition made up for the most part of a liquid solvent of rubber which is substantially non-volatile at the temperature of compounding and vulcanizing and which has dissolved therein an oil-soluble sulfonated product as an activator, adding the master batch to a larger amount of raw rubber and subjecting the same to mechanical working to effect rapid conversion of the raw rubber into a thermo-plastic mass suitable for compounding.

17. The improvement in the compounding of rubber which comprises subjecting raw rubber to mechanical working with the addition thereto of about 4 to 8% of a liquid thermo-plasticizing composition comprising a liquid hydrocarbon of the nature of 300° burning oil having dissolved therein a small percentage of an oil-soluble sulfonated oil, whereby the raw rubber is rapidly converted into a plastic mass suitable for compounding and incorporating the compounding ingredients with the resulting plastic mass.

18. The improvement in the compounding of rubber which comprises subjecting raw rubber to mechanical working with the addition thereto of around 4 to 8% of a liquid thermo-plasticizing composition comprising a liquid hydrocarbon of the nature of 300° burning oil having dissolved therein a small percentage of an oil-soluble sulfonated hydrocarbon oil and a small percentage of a higher alcohol, whereby the raw rubber is rapidly converted into a plastic mass suitable for compounding and incorporating the compounding ingredients with the resulting plastic mass.

19. An improved rubber composition comprising raw rubber converted into a plastic state suitable for compounding by mechanical working of the raw rubber with the addition thereto of a small amount of a liquid thermo-plasticizing composition made up for the most part of a liquid hydrocarbon solvent of rubber of the nature of 300° burning oil containing dissolved therein a small amount of an oil-soluble sulfonated oil as an activator, said rubber composition being a thermo-plasticized composition produced without prolonged mechanical working of the rubber.

20. A rubber composition comprising compounding rubber which has been prepared for compounding by mechanical working with the addition of a small amount of a liquid thermo-plasticizing composition made up for the most part of a liquid hydrocarbon solvent of rubber of the nature of 300° burning oil having dissolved therein a small amount of an oil-soluble sulfonated oil as an activator, said compounded rubber product having the properties of a rubber product produced without prolonged mechanical working of the rubber.

21. A rubber composition having incorporated therewith a small amount of a liquid thermoplasticized composition made up for the most part of a liquid hydrocarbon solvent of rubber of the nature of 300° burning oil containing dissolved therein small amounts of an oil-soluble sulfonated oil and of a higher alcohol as activators.

22. Vulcanized rubber products prepared for compounding before vulcanization by mechanical working of the rubber, substantially without mastication or breaking down of the rubber, in the presence of a small amount of a liquid thermoplasticizing composition made up for the most part of a substantially non-volatile liquid solvent of rubber containing dissolved therein a small amount of an oil-soluble sulfonated product as an activator.

23. Vulcanized rubber products prepared for compounding before vulcanization by mechanical working of the rubber, substantially without mastication or breaking down of the rubber, in the presence of a small amount of a liquid thermoplasticizing composition made up for the most part of a substantially non-volatile liquid solvent of rubber containing dissolved therein a small amount of an oil-soluble sulfonated product as an activator and also containing dissolved therein a small amount of a higher alcohol.

24. The method of producing a liquid thermoplasticizing composition for use in the compounding of rubber which comprises adding to a liquid hydrocarbon, which is a solvent of rubber, a large amount of an oil-soluble sulfonated petroleum product, and subsequently diluting the resulting mixture with a large amount of the hydrocarbon oil.

25. The method of producing a liquid thermoplasticizing composition for use in the compounding of rubber which comprises adding to a liquid hydrocarbon, which is a solvent of rubber, a large amount of an oil-soluble sulfonated petroleum oil, also adding commercial secondary hexyl alcohol, and subsequently diluting the mixture with a large amount of hydrocarbon oil.

ROBERT J. KING.
ELIZABETH C. KING.